(12) United States Patent
Raimondo et al.

(10) Patent No.: US 7,174,967 B2
(45) Date of Patent: Feb. 13, 2007

(54) HITCH AND CONTROL ASSEMBLY

(76) Inventors: Joseph A. Raimondo, 490 S. County Rd., 115, Bunnel, FL (US) 32110; Kenneth Foust, 761 Woodland Bayou Dr., Santa Rosa Beach, FL (US) 32459

( * ) Notice: Subject to any disclaimer, the term of this patent is extended or adjusted under 35 U.S.C. 154(b) by 0 days.

(21) Appl. No.: 10/868,534

(22) Filed: Jun. 15, 2004

(65) Prior Publication Data
US 2005/0274533 A1   Dec. 15, 2005

(51) Int. Cl.
*A01B 59/06* (2006.01)
(52) U.S. Cl. ...................... 172/439; 172/451
(58) Field of Classification Search ................ 172/439, 172/451, 443
See application file for complete search history.

(56) References Cited

U.S. PATENT DOCUMENTS

| | | | | |
|---|---|---|---|---|
| 3,727,698 A | * | 4/1973 | Van Selus | 414/703 |
| 5,423,394 A | * | 6/1995 | Kendle | 180/53.3 |
| 6,148,928 A | * | 11/2000 | Spears | 172/439 |
| 6,257,347 B1 | * | 7/2001 | Campisi | 172/439 |
| 6,293,351 B1 | * | 9/2001 | Schmidt | 172/439 |
| 6,796,384 B1 | * | 9/2004 | Potter | 172/439 |

* cited by examiner

*Primary Examiner*—Thomas A Beach
(74) *Attorney, Agent, or Firm*—Starkweather & Associates; Michael W. Starkweather; Jason P. Webb

(57) ABSTRACT

A self-contained hitch and control assembly comprising a portable power unit including a gas engine, hydraulic pump and associated conduits and valves. A hitch apparatus includes a frame carrying a compatible hitch and a pair of connecting arms with a third arm above and between the pair of arms. A hydraulic cylinder both raises and lowers the arms and a power takeoff is driven by the power unit in one and opposite directions.

17 Claims, 6 Drawing Sheets

HITCH AND CONTROL ASSEMBLY

BACKGROUND OF THE INVENTION

Various hitch assemblies have been available for connecting lawn mowers, tillers and a wide variety of other implements to pick-up trucks and the like. These hitch assemblies have not, however, been wholly satisfactory.

Accordingly, it is the general object of the present invention to provide an improved hitch and control assembly which not only provides for highly efficient towing of an implement but also provides for control of the operation of the implement.

A further object resides in the provision of an improved hitch and control assembly which is completely self-contained and which therefore can be used with any pickup or other powered vehicle irrespective of auxiliary features such as hydraulics, power takeoff etc. carried by the vehicle.

A still further object of the invention is the provision of a portable power unit for the hitch and control assembly which can be readily deposited in and removed from the cargo space of a pickup truck or the like, and which can also be readily adapted for stationary use.

SUMMARY OF THE INVENTION

In accordance with the present invention and in fulfillment of the foregoing objects, the hitch and control assembly of the invention is adapted for use with any powered vehicle, preferably a pickup truck, having a vertically open substantially horizontal cargo surface and a hitch element. The hitch and control assembly comprises a self-contained portable power unit disposed on said cargo surface and including an internal combustion engine driving a fluid pump and associated valves and conduits. A hitch apparatus includes a forwardly facing hitch element compatible with the hitch element on the powered vehicle and a frame carrying a pair of horizontally spaced rearwardly extending connecting arms each supported by the frame for pivotal movement in a vertical plane at a front end portion and free at a rear end portion for attachment to an implement to be towed by the vehicle. A cylinder operable under fluid pressure is connected between the frame and the connecting arms and is adapted to pivot the arms in unison in both upward and downward directions. As will be seen herein below the downward arm movement under pressure is particularly useful in the control of the implement by the hitch assembly. As will also be explained below, the aforementioned fluid conduits are releasably and selectively connectible between the fluid pump and the fluid operable cylinder by operation of at least one of the aforesaid levers.

In addition to the foregoing, the hitch and control assembly includes a fluid pressure operated rotary power takeoff with the fluid conduits again releasably and selectively connectible between the pump and the power takeoff for rotation of the latter in one and an opposite direction. Control of the implement is also enhanced by this feature as will be explained below in connection with a power driven auger.

Portability of the self-contained power, unit is an important feature especially where a pickup truck or the like lacks one or more auxiliary capabilities. Accordingly, the power unit is mounted on a platform which includes at least three spaced attachment means and a lift device is provided and is releasably connectible with the attachment means for depositing the power unit on the cargo surface of the powered vehicle and removing the same from the surface. Stationary use of the power unit as well as the assembly as a whole is of course also possible in a multitude of applications.

DESCRIPTION OF THE DRAWINGS

FIG. 3 is a vertical elevation of the frame taken from its front side partially showing fluid conduits and clearly showing a hitch element adapted for connection with a compatible element on a pickup truck or the like.

DESCRIPTION OF THE PREFERRED EMBODIMENT

Figure 1:
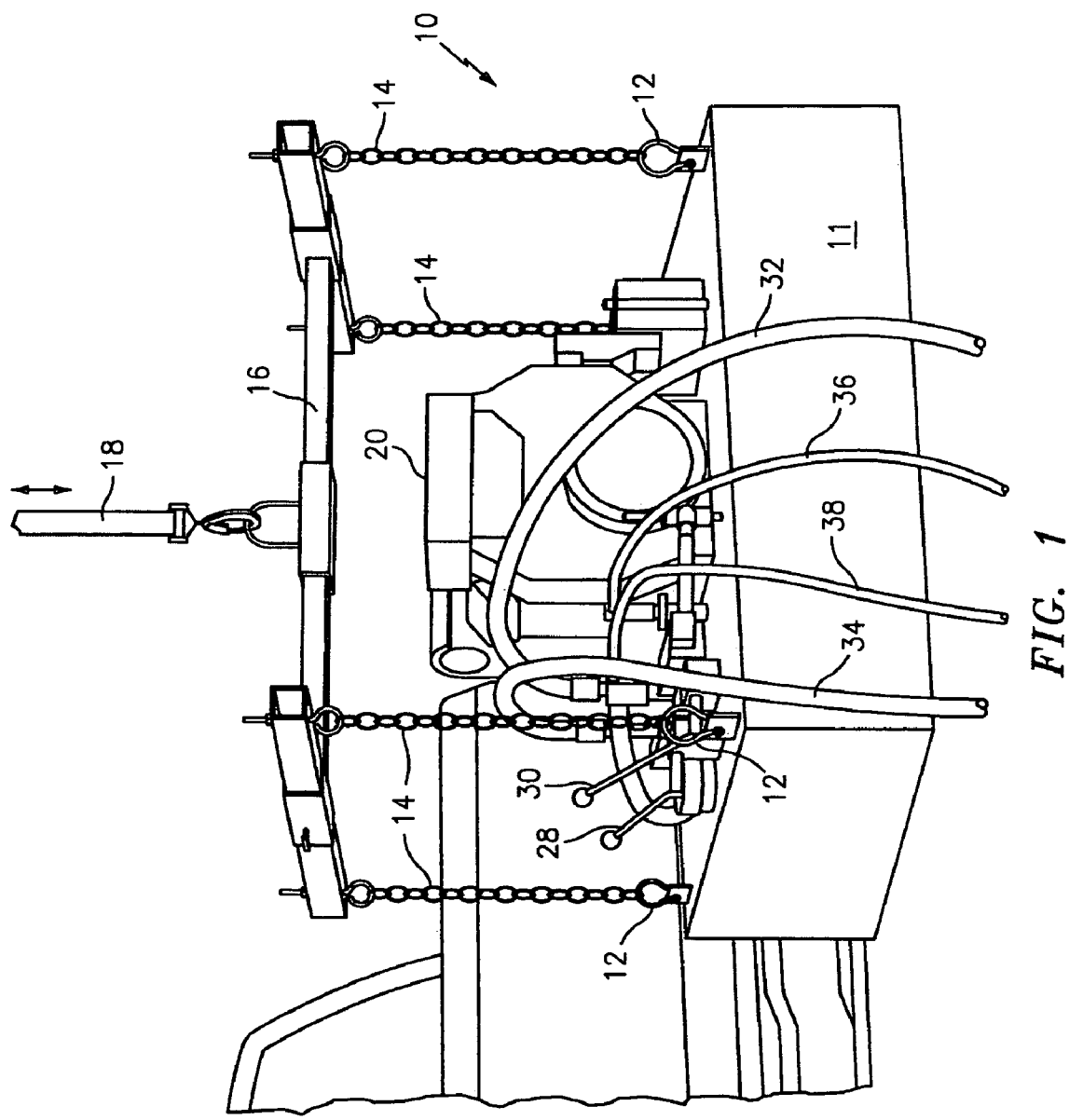
FIG. 1 is a perspective view of a power unit forming a part of the hitch and control assembly of the present invention together with a lift device operatively connected with and supporting the assembly.
Figure 5:
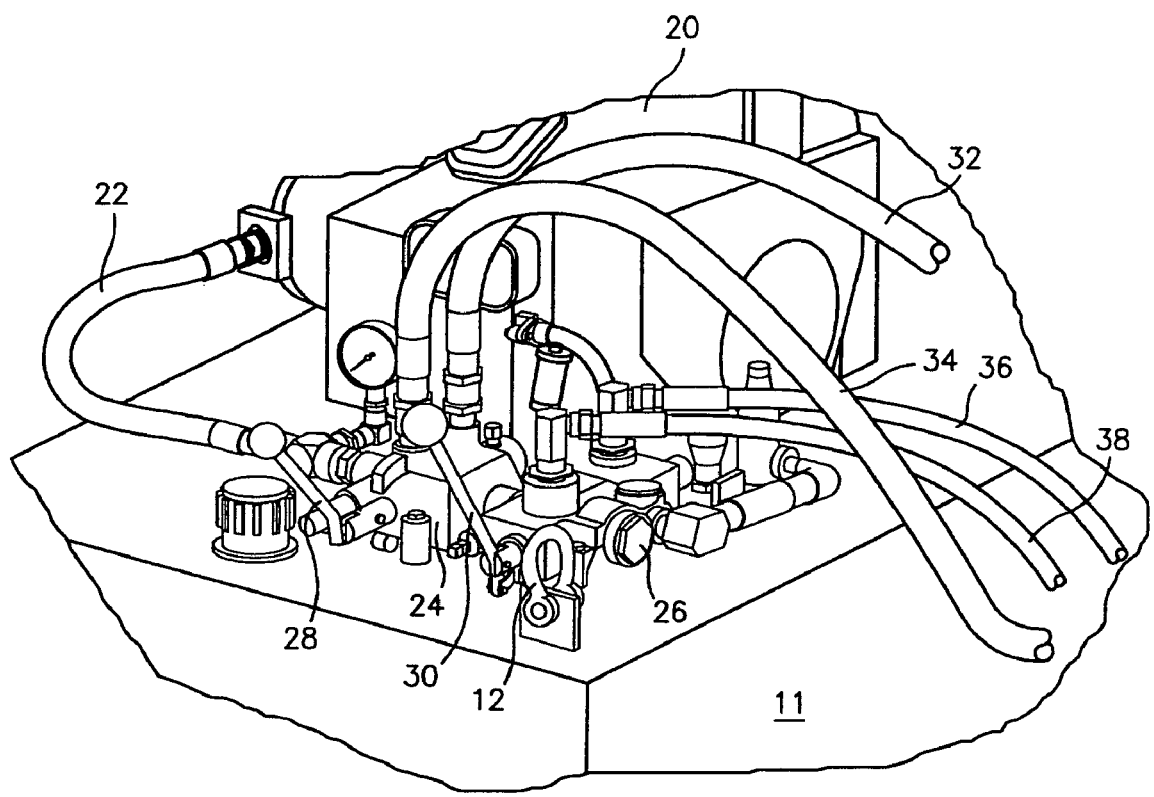
FIG. 5 is an enlarged perspective view of valves and conduits forming a part of the improved hitch and control assembly.

Referring particularly to FIGS. 1 and 5, the power unit, or power generation system, is shown generally at 10 and is shown supported by a lift device in FIG. 1. The unit includes a generally rectangular platform 11 which has eye members 12,12 at its four corners for attachment to lift chains 14,14 at four corners of the lift device. The lift device also includes a frame 16 which supports the chains at their upper ends and which has a central lift element 18 which may be manually operated or which may of course be provided with a small electric motor, not shown. As will be apparent the power unit can be readily lowered into position on the cargo surface, or bed, of a pickup truck or the like or a stationary surface by the lift device. Alternatively, the unit may be raised front the cargo surface or stationary surface to an elevated storage position in a garage or other building. Optionally, means for attaching the power unit to the cargo surface may be provided. The unit shown, however, weighs approximately four hundred (400) pounds and does not require attachment or tie down means.

Power supply apparatus 20 comprises an internal combustion engine preferably in the form of a twenty six horsepower gas engine driving a fluid pump in the form of a hydraulic pump which supplies hydraulic fluid under pressure through a supply line 22. There is a power transfer system that may include one or more of the following: the valve 24, the supply line 22, the control lever 28, the valve 26, and conduits 32 and 34. The apparatus is self contained and has its own battery and fuel storage reservoir as well as other accessories. Supply line 22 extends to valve 24 which has a manually operable control lever 28 and valve 24 in turn supplies valve 26 with hydraulic fluid under pressure, the latter controlled by manual lever 30. Both valves 24 and 26 may optionally be remotely controlled and may also be equipped with the well known float control feature. Extending from valve 24 are conduits 32 and 34 which in turn supply opposite sides of a rotary takeoff to be described.

Conduits 36 and 38 extend from valve 26 to opposite sides of an operating piston in a hydraulic cylinder also to be described herein below.

Figure 2:
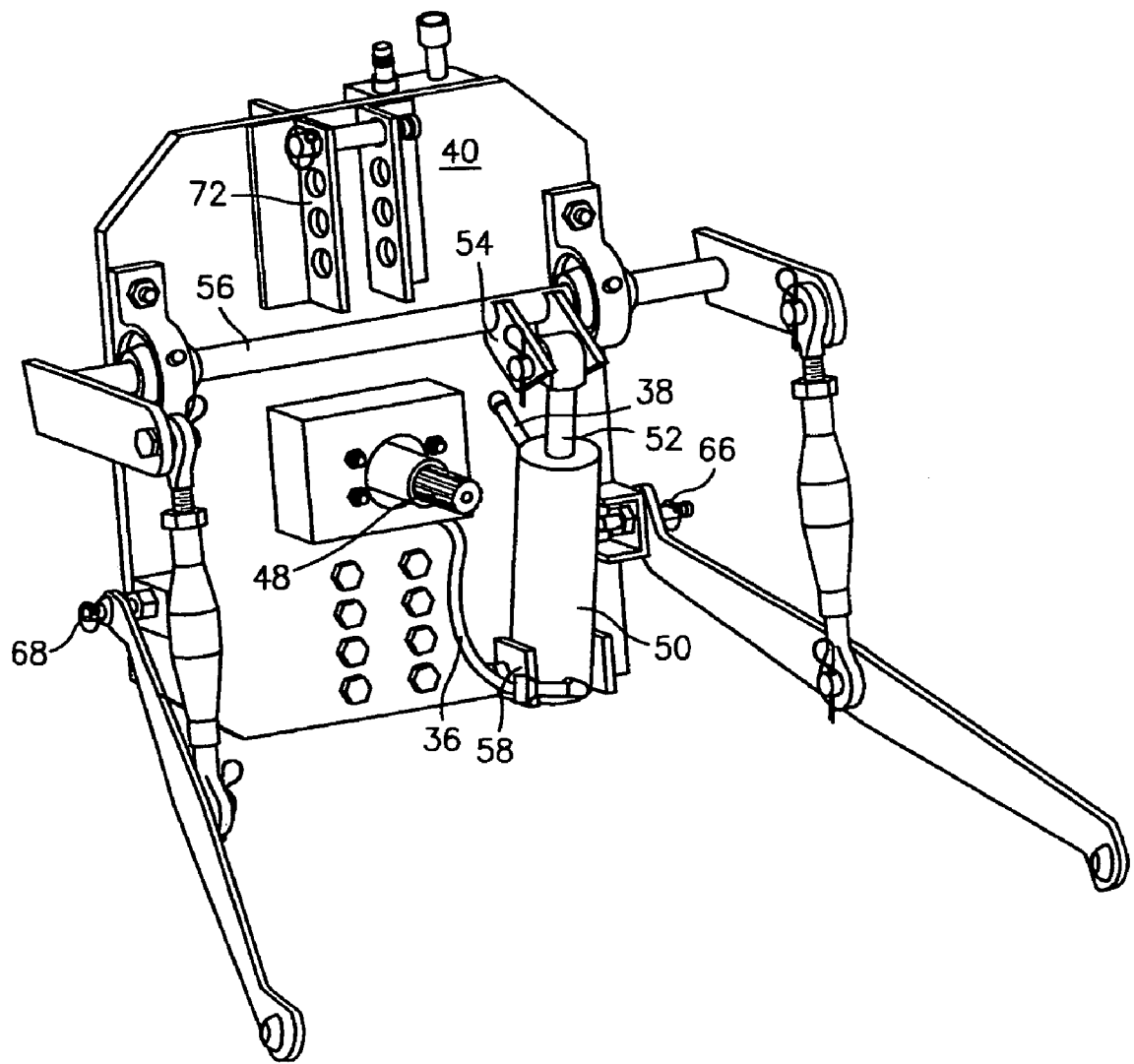
FIG. 2 is a perspective view of a rear portion of a frame of the hitch and control assembly and shows connecting arms, a fluid cylinder for operating the arms and a rotary power takeoff unit.
Figure 3:
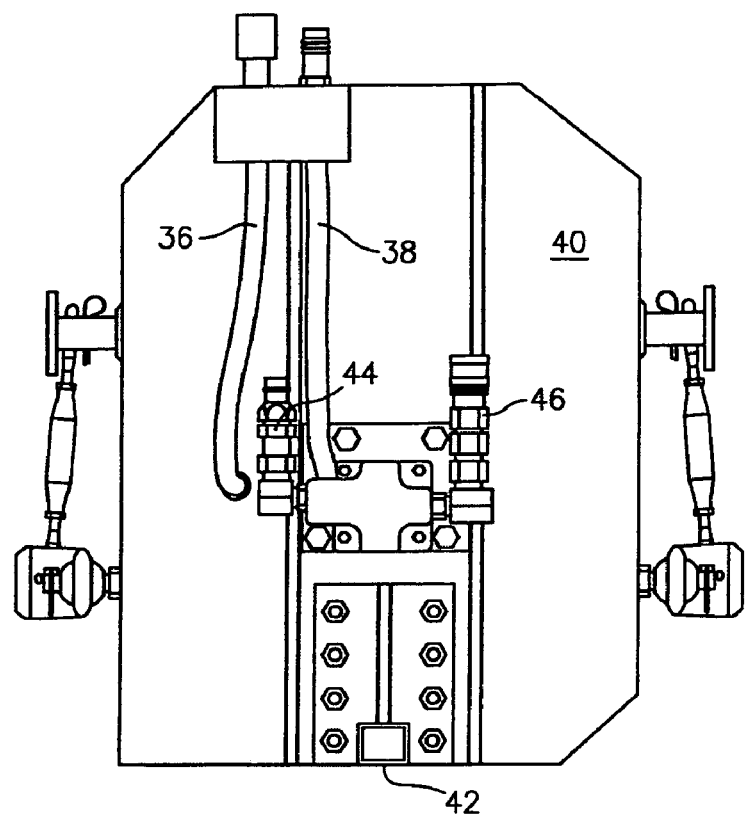
Figure 4:
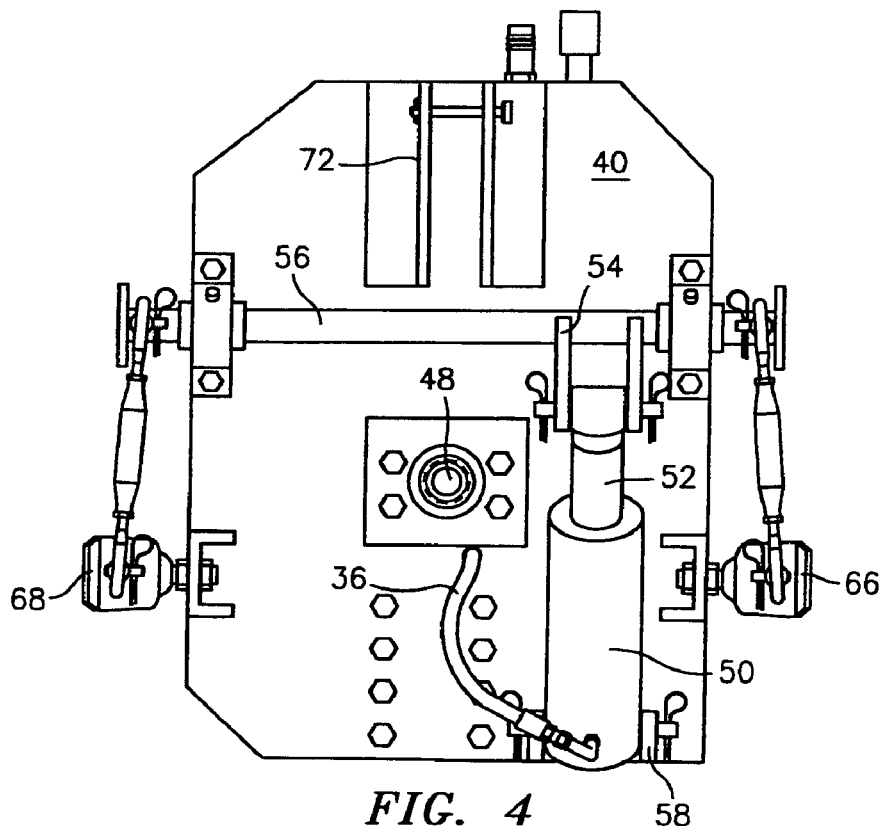
FIG. 4 is a vertical elevation similar to FIG. 2 and shows the connecting arms, fluid cylinder and power takeoff.
Figure 6:
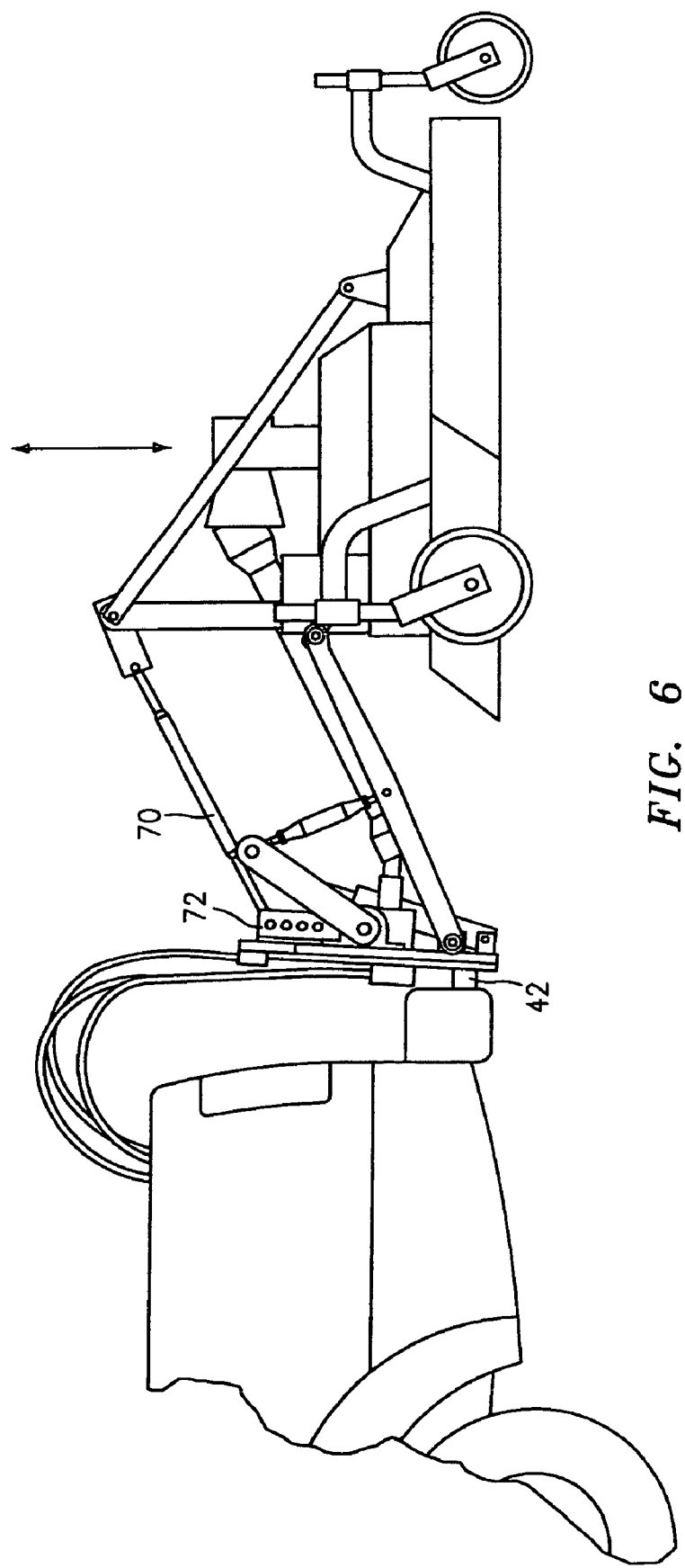
FIG. 6 is a side view showing a lawn mower attached to and towed by the hitch and control assembly of the invention.
Figure 7:
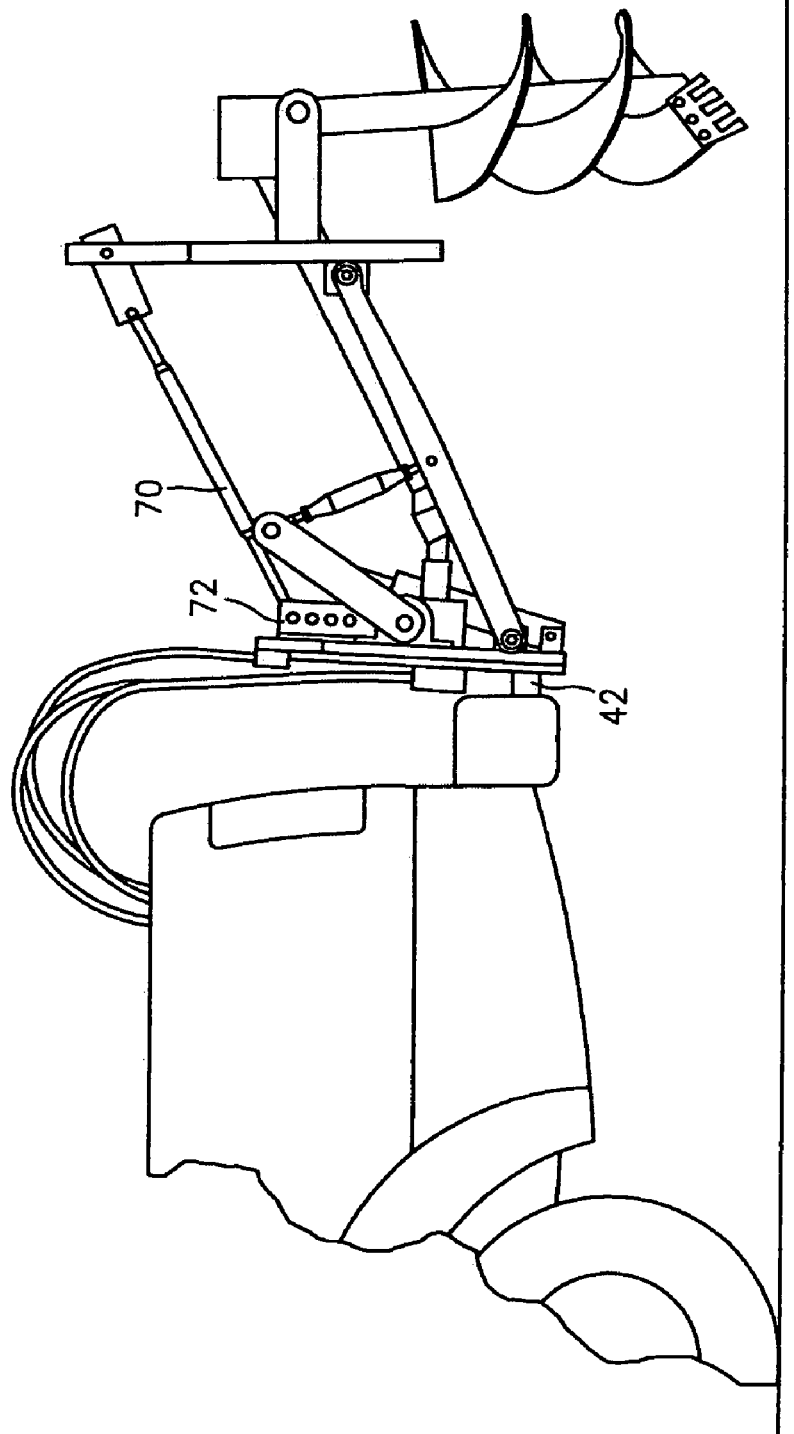
FIG. 7 is a side view showing a rotary auger attached to the hitch and control assembly.

Referring to FIGS. 2, 3 and 4, a frame 40 of the hitch and control assembly carries a male hitch element 42, FIGS. 6 and 7, which hives forwardly and which is compatible with a similar rearwardly facing female element on a tail of a pickup truck or the like. There is also shown an implement mounting system for coupling an implement to a vehicle that includes one or more of the following: a frame 40, quick connect-disconnect elements 44 and 46, power take off unit 48, hydraulic cylinder 50, output rod 52, rock shaft 56, drive links 60, adjustable connectors 62, and connecting anns 64 and 70.

Cooperating connecting elements of various other types may also be provided. Also on the front surface of the frame 40 in FIG. 2, quick connect-disconnect elements 44 and 46 respectively connect with the aforementioned conduits 32 and 34 and supply hydraulic fluid under pressure selectively to opposite sides of a rotary power takeoff unit 48, shown in FIGS. 2 and 4 on the rear side of the frame 40. Reverting to FIG. 3 and viewing the front side of frame 40, the aforementioned conduits 36 and 38 are shown passing through the frame to the rear side thereof. In FIGS. 2 and 4, the conduits are shown connected respectively with one and an opposite end of a hydraulic cylinder 50. As will be apparent, hydraulic fluid under pressure can be supplied selectively to opposite ends of the cylinder 50 by manipulation of the lever 30 manually or remotely whereby to cause the output rod 52 of the cylinder to move in one and an opposite direction. The output rod 52 of the cylinder 50 is pivotally connected to an operating arm 54 for a rock shaft 56 and with the opposite end of cylinder 50 pivotally connected to the frame at 58, the rock shaft 56 serves to swing a pair of drive links 60,60 fixed at opposite ends thereof in one and an opposite direction. The links 60,60 in turn generally reciprocate adjustable connectors 62,62 which extend downwardly to a pair of connecting arms 64,64. The connecting arms 64,64 are pivotally mounted respectively at 66 and 68 on the frame 40 and at their free ends are adapted for connection to an implement to be towed and controlled by the hitch and control assembly of the invention.

Finally, a third connecting arm 70 is preferably provided for stabilization of implements drawn behind a powered vehicle and is shown pivotally mounted at 72 on the frame 40, adjustment being provided by the series of connecting holes.

A wide variety of implements can be drawn behind and controlled by the hitch and control assembly of the present invention, the lawnmower 74 and auger 76 of FIGS. 6 and 7 being merely exemplary. It should be noted, however, that the control function of the assembly is available in all instances. In the case of the lawnmower 74, the angle of attack of the mower can be controlled by manipulation of the hydraulic cylinder thus determining the height of the cut in a simple and expedient manner. Further the mower can be driven by the power takeoff rather than an engine mounted on its housing. Thus, clogging with wet grass and other problems can be addressed by reversing the rotation of the mower blade.

In the case of the rotary auger, the efficiency of operation of the auger can be enhanced by urging the same downwardly during operation, again by appropriate manipulation of the hydraulic cylinder and its control valve. Reversal of the direction of rotation by the power takeoff will also aid in the withdrawal of the auger on completion of its task.

The invention claimed is:

1. A self-contained hitch and control assembly for use with a vehicle, comprising:
   a flame configured to couple to the vehicle;
   an arm pivotally coupled to the frame and extending therefrom;
   a fluid operable cylinder mechanically coupled to the frame and to the arm;
   a self-contained power unit;
   a fluid pump coupled to the self-contained power unit such that energy may be drawn to the fluid pump; and
   a plurality of fluid conduits selectively and hydrodynamically coupling the fluid pump to the fluid operable cylinder whereby fluid under pressure can be supplied to selectively drive the arm to move in one direction and in another direction, wherein the self-contained power unit is not coupled to the frame except by the plurality of fluid conduits.

2. The self-contained hitch and control assembly of claim 1, further comprising a platform coupled to an underside of the self-contained power unit and configured to support the self-contained power unit.

3. The self-contained hitch and control assembly of claim 1, wherein the frame comprises a rigid planar member.

4. The self-contained bitch and control assembly of claim 1, further comprising:
   an operating arm pivotally coupled to the fluid operable cylinder; and
   a drive link pivotally coupled to the operating arm at a first end and the arm at a second end.

5. The self-contained hitch and control assembly of claim 1, further comprising a power take-off functionally coupled to the self-contained power unit and configured to provide power to an implement.

6. The self-contained hitch and control assembly of claim 5, wherein the power take-off is hydraulically coupled to the self-contained power unit and wherein the power take-off extends through an aperture substantially centered in the frame.

7. The self-contained hitch and control assembly of claim 2, further comprising a lever mechanically coupled to a top of the platform and functionally coupled to the plurality of fluid conduits, wherein actuation of the lever selectively drives the arm to move.

8. The self-contained hitch and control assembly of claim 1, further comprising:
   a pair of connecting arms, pivotally coupled to the frame, each coupleable to an implement to be towed and controlled by the hitch and control assembly.

9. The self-contained hitch and control assembly of claim 8, further comprising:
   a third arm, pivotally coupled to the frame, wherein the third arm is configured to provide stabilization of implements to be towed and controlled by the hitch and control assembly.

10. The self-contained hitch and control assembly of claim 9, further comprising:
    a plurality of connecting holes, disposed on the frame, wherein the third arm is pivotally coupled to the frame at the plurality of connecting holes.

11. The self-contained hitch and control assembly of claim 1, further comprising connect-disconnect elements, coupled to the frame, configured to connect and disconnect the frame to the plurality of fluid conduits.

12. The self-contained hitch and control assembly of claim 4, further comprising:
   a pair of connecting arms, pivotally coupled to the frame, each coupleable to an implement to be towed and controlled by the hitch and control assembly.

13. The self-contained hitch and control assembly of claim 12, further comprising:
   a third arm, pivotally coupled to the frame, wherein the third arm is configured to provide stabilization of implements to be towed and controlled by the hitch and control assembly.

14. The self-contained hitch and control assembly of claim 13, further comprising:
   a plurality of connecting holes, disposed on the frame, wherein the third arm is pivotally coupled to the frame at the plurality of connecting holes.

15. The self-contained hitch and control assembly of claim 5, further comprising:
   a pair of connecting arms, pivotally coupled to the frame, each coupleable to an implement to be towed and controlled by the hitch and control assembly.

16. The self-contained hitch and control assembly of claim 15, further comprising:
   a third arm, pivotally coupled to the frame, wherein the third arm is configured to provide stabilization of implements to be towed and controlled by the hitch and control assembly.

17. The self-contained hitch and control assembly of claim 16, further comprising:
   a plurality of connecting holes, disposed on the frame, wherein the third arm is pivotally coupled to the frame at the plurality of connecting holes.

* * * * *